United States Patent [19]

Tahara et al.

[11] 4,454,460
[45] Jun. 12, 1984

[54] D.C. ROTARY MACHINE WITH INTERPOLE COMPENSATION

[75] Inventors: Kazuo Tahara; Takayuki Matsui; Haruo Koharagi, all of Hitachi; Hisaya Sasamoto, Mito; Seiji Yamashita, Katsuta; Noriyoshi Takahashi, Hitachi, all of Japan

[73] Assignee: Hitachi, Ltd., Tokyo, Japan

[21] Appl. No.: 495,593

[22] Filed: May 18, 1983

[30] Foreign Application Priority Data

May 22, 1982 [JP] Japan .................... 57-85672

[51] Int. Cl.³ .................... H02K 23/18; H02K 23/20
[52] U.S. Cl. .................... 318/491; 318/361; 318/439; 318/496; 318/541
[58] Field of Search ............ 318/361, 439, 491, 492, 318/495, 496, 541, 434

[56] References Cited

U.S. PATENT DOCUMENTS

| | | | |
|---|---|---|---|
| 2,664,535 | 12/1953 | Smith | 318/439 X |
| 2,666,881 | 1/1954 | Williams | 318/439 X |
| 2,693,564 | 11/1954 | Pasculle | 318/439 X |

FOREIGN PATENT DOCUMENTS

| | | | |
|---|---|---|---|
| 56-15155 | 2/1981 | Japan | 318/541 |
| 406272 | 7/1974 | U.S.S.R. | 318/361 |

*Primary Examiner*—B. Dobeck
*Assistant Examiner*—Bentsu Ro
*Attorney, Agent, or Firm*—Antonelli, Terry & Wands

[57] ABSTRACT

The first and second interpole compensation windings are disposed on the commutation starting side and the commutation ending side of the interpole cores, respectively. The current flowing through the first and second interpole compensation windings are controlled in response to the first and second voltages detected by the first and second brushes disposed on the commutation starting side and the commutation ending side of the brushes.

8 Claims, 5 Drawing Figures

D.C. ROTARY MACHINE WITH INTERPOLE COMPENSATION

BACKGROUND OF THE INVENTION

This invention relates to a D.C. rotary machine, and more particularly to such a D.C. rotary machine which is provided with interpole compensation equipment.

Briefly, a D.C. rotary machine is generally composed of a stator or a field structure, a rotor or an armature, and a commutation structure. The stator includes a yoke of annular shape, a plurality of main poles provided by winding main pole windings respectively around a plurality of main pole cores disposed along the inner peripheral face of the yoke in a relation circumferentially spaced apart by a predetermined distance from each other, and a plurality of interpoles provided by winding interpole windings respectively around a plurality of interpole cores disposed between the plural main poles. The rotor includes an armature core or a rotor core fixedly mounted on a rotary shaft, and an armature winding received in many slots formed in the outer periphery of the rotor cores. The commutation structure includes a commutator fixedly mounted on the rotary shaft, and brushes disposed on the stator side to make slidable contact with the commutator segments for performing the commutation in cooperation with the commutator. The main magnetic flux produced from the main poles is directed toward the armature, and the interpole magnetic flux produced from the interpoles for generating the commutating emf during commutation, in which reversal of the armature current occurs, is also directed toward the armature.

This interpole flux is effective to a certain extent for compensating the non-uniformity of the main magnetic flux distribution attributable to the armature reaction and also to the relative polarities of the main poles and interpoles. Actually, however, the magnetic flux distribution around the interpole is frequently unsymmetrical with respect to the circumferential center of the interpole.

In order to prevent this unsymmetrical magnetic flux distribution, the interpole compensation windings are usually wound around a plurality of interpole cores.

A D.C. rotary machine of this type has been disclosed, for example, in Japanese Patent Publication No. 46299/82.

With the D.C. rotary machine having such as conventional interpole compensation windings, however, sparks generated at the commutation starting side and the commutation ending side can not be compensated thereby, that is, when a no-spark zone is immigrated from the previous setting zone to the others, the conventional D.C. rotary machine can not compensate the commutating electromotive force (emf) during commutation corresponding to the immigration of the no-spark zone.

SUMMARY OF THE INVENTION

An object of the present invention is to provide a D.C. rotary machine capable of adjusting total flux thereof.

The present invention bases on that the immigration phenomenon of the no-spark zone is founded on the variation of the rotational speed of the D.C. rotary machine.

According to the present invention, the variation of the rotational speed of the D.C. rotary machine can be detected by the first and second brushes disposed on the commutation starting side and the commutation ending side of each brush of the D.C. rotary machine. Necessary interpole additional currents for compensating the sparks generated at the commutation starting side and the commutation ending side of the brush can be introduced to the first and second interpole compensation windings disposed on the commutation starting side and the commutation ending side of the interpole, respectively, by the first and second current controllers which control the current value flowing through the above mentioned first and second interpole compensation windings.

DESCRIPTION OF THE PREFERRED EMBODIMENT

Figure 1:
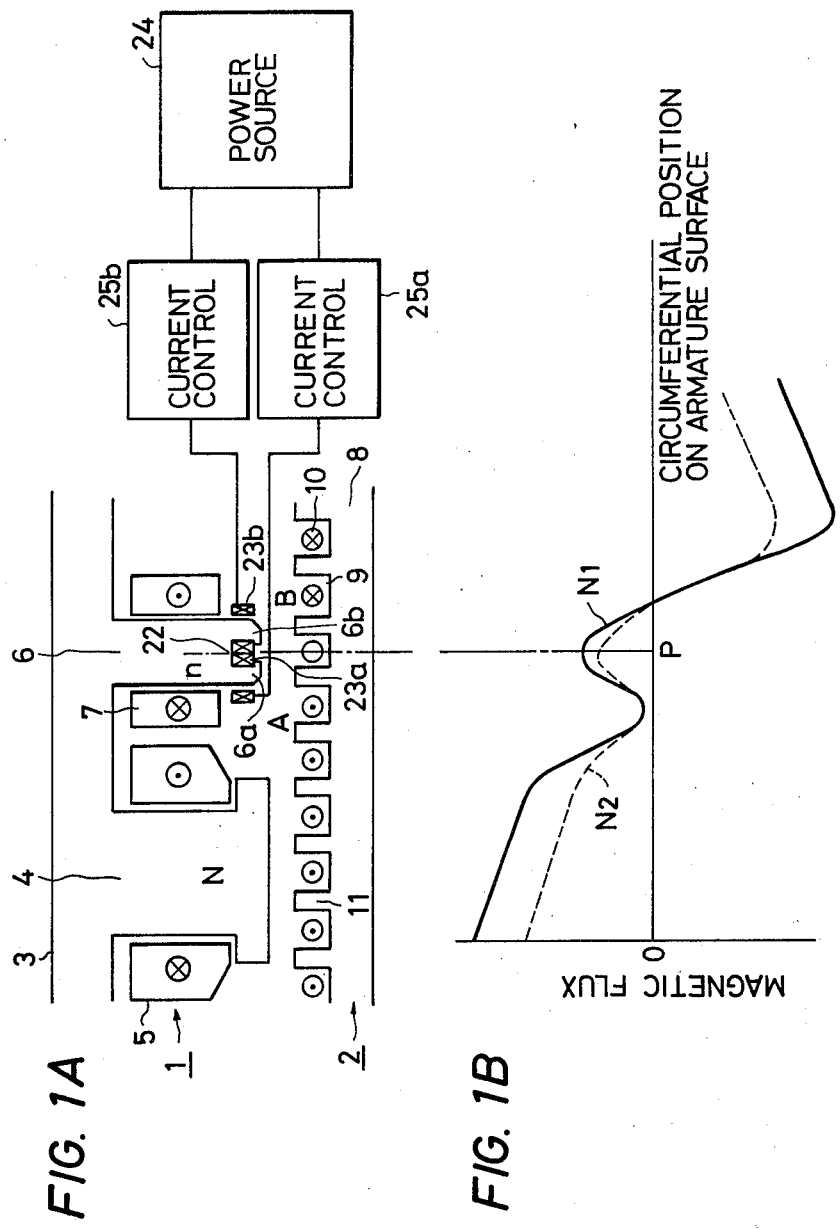
FIG. 1A is a developed view of part of a preferrred embodiment of the stator according to the present invention.
FIG. 1B is a graph showing the magnetic flux distribution at the circumferential positions on the surface of the armature in the D.C. rotary machine including the stator shown in FIG. 1A.

Referring to FIG. 1, a D.C. rotary machine is composed of the stator 1, the rotor or armature 2, and the commutation equipment (not shown).

A plurality of main pole iron cores 4 and interpole iron cores 6 are securely fixed to the inner peripheral face of an iron yoke 3 of annular shape. Main pole windings 5 are wound around each of the main pole cores 4 to constitute main poles, and interpole windings 7 are wound around each of the interpoles cores 6 to constitute interpoles. The elements above described constitute the principal parts of the stator 1.

The rotor 2 (armature) rotatable relative to the stator includes a rotary shaft (not shown) rotatably supported in the end bracket and bearings (not shown), and an armature core 8 fixedly mounted on the shaft. The armature core 8 is formed at its outer periphery with many teeth 11 and slots 9. Armature windings 10 are received in each of the slots 9.

The commutation equipment consits of the commutator fixedly mounted on the shaft adjacent to the armature core 8, and the brushes (not shown) in a position capable of making sliding contact with the segments of the commutator.

Figure 2:
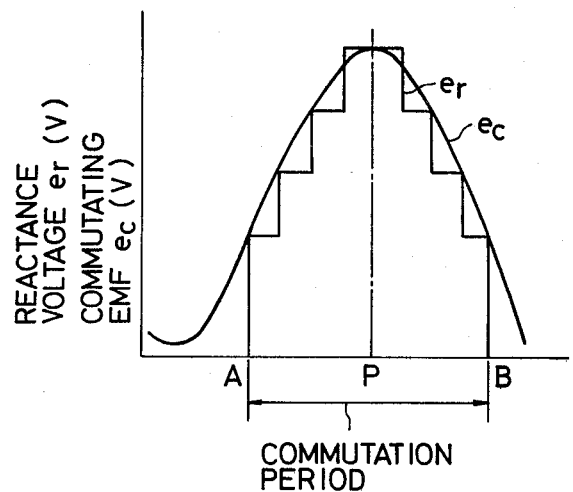
FIG. 2 is a graph showing a similar relationship between the reactance voltage and the commutating emf generated in the D.C. rotary machine during commutation.

In such a rotary machine, an embodiment of the present invention shown in FIG. 1 is preferably employed. Referring to FIG. 1, independent interpole compensation windings 23a and 23b are wound around the teeth 6a and 6b or the side faces of an axially extending slot 23 formed at the radially inner end of the interpole core 6 respectively, and a power source 24 is connected through current control units 25a and 25b to the interpole compensation windings 23a and 23b wound in identical directions, respectively, to supply a control current so that each of the interpole compensation winding 23a and 23b can generate the magnetomotive force providing the commutating emf $e_c$ which corresponds substantially to the waveform of the reactance voltage $e_r$ of the commutation coils in the commutation period. More precisely, the magnetomotive force of the interpole compensation winding 23a disposed on the commutation starting side (shown by A) is selectred to be small, and that of the interpole compensation winding 23b disposed on the commutation ending side (shown by B) is selected to be large, so that the amount of magnetic flux produced at the highest rotation speed $N_2$ (shown by the broken curve) differs from that at the base rotation speed $N_1$ (shown by the solid curve) and the circumferential magnetic flux distribution is substantially symmetrical with respect to the circumferential center point P of the interpole core 6, as shown in FIG. 1B. Thus, as shown in FIG. 2, the waveform of the commutating emf $e_c$ in the commutation period can always substantially coincide with that of the reactance voltage $e_r$ of the commutation coils at any load level (the armature current) and at any rotation speed.

As described above, the values of the exciting current supplied to the interpole compensation winding 23b differs from that supplied to the interpole compensation winding 23a, and it is necessary to decrease these current values with the increase in the rotation speed of the rotary machine so as to compensate for immigration phenomenon of the no-spark zone. According to our invention, this compensation can be accomplished as shown in the following explanation.

Figure 3:
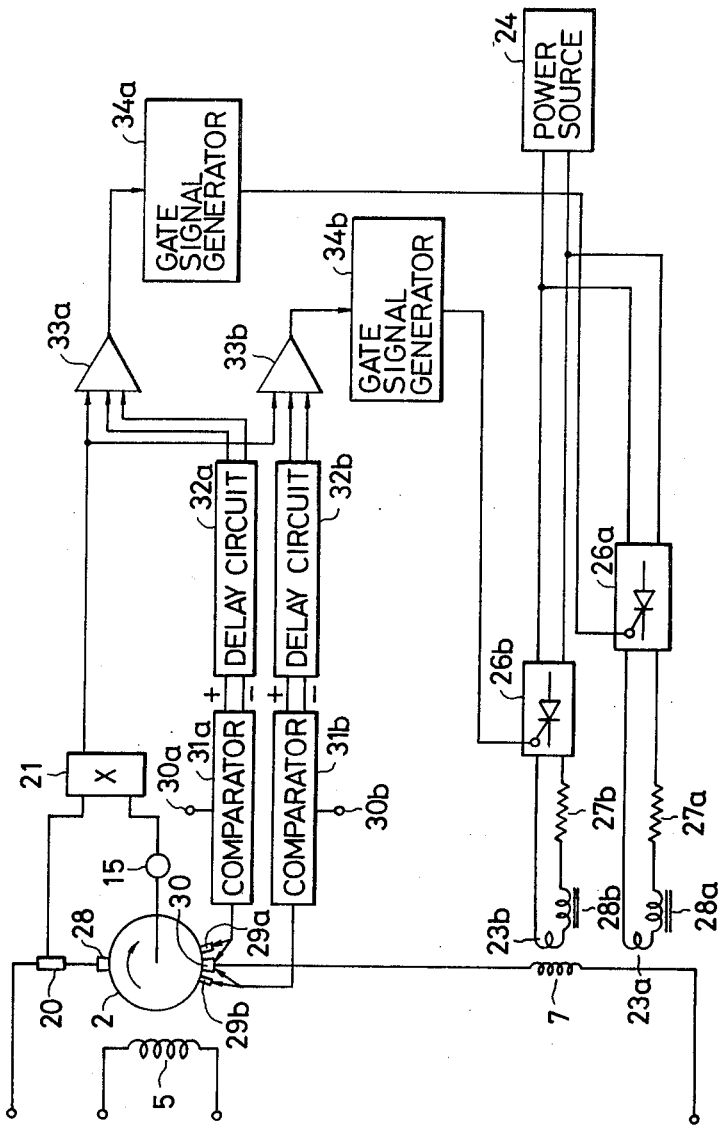
FIG. 3 is a block diagram showing a preferred embodiment of the commutation compensating equipment according to the present invention.

In FIG. 3, the same reference numerals are used to designate the same or equivalent parts appearing in FIG. 1. 27a, 27b are resistors, 28, 30 are brushes, and 28a, 28b are D.C. reactors. The current control circuit includes the current detector 20, the rotation detector 15, the multiplier 21, the brushes 30, the first and second brushes 29a, 29b disposed on a commutation starting side and a commutation ending side of the brush 30, the comparators 31a, 31b having input terminals 30a, 30b, respectively, for inputing setting voltages of plus or minus which decide the no-spark zone, the delay circuits 32a, 32b comprising the integrating circuits, the adders 33a, 33b, the gate signal generators 34a, 34b, and the current control switching circuits 26a, 26b. The first and second brushes 29a, 29 b are disposed on a commutation starting side and a commutation ending side of the brush 30, and the first and second interpole compenstion windings 23a, 23b are disposed on all interpole cores 6. In FIG. 3, only a pair of the first and second interpole compensation windings 23a, 23b are shown for simplifying the explanation of FIG. 3.

The operation of the compensation current control circuit having the above structure will be described presently.

If the armature 2 is turned in the direction of the arrow shown in FIG. 3, the first brush 29a detects the first voltage between the first brush 29a and the brush 30, when the segment of the commutator begins to contact with the first brush 29a, and the second brush 29b detects the second voltage between the second brush 29b and the brush 30, when the segment of the commutator begins to leave from the second brush 29b. The detected first and second voltages are inputted to the comparator 31a, 31b, respectively. As the comparators 31a, 31b are inputted the setting voltages of plus or minus which decides the no-spark zone through the input terminals 30a, 30b, the detected first and second voltages by the first and second brushes 29a, 29b are compared with the above mentioned setting voltages. As the first and second detected voltages of the first and second brushes 29a, 29b are usually in the scope of about ±3 V in the condition of no-spark commutation being taken place, the above mentioned setting voltages are selected to be ±2 V.

When the first and second voltages of the first and second brushes 29a, 29b are in the range of ±2 V, the outputs of the comparators 31a, 31b become zero levels. When the first and second voltages are in the range of more than +2 V, the comparators 31a, 31b output the excess voltage over +2 V from the plus side output terminals thereof for increasing the magnetomotive force (hereinafter, mmf) of the interpole. When the first and second voltages are in the range of less than −2 V, the comparators 31a, 31b output the excess voltage over −2 V from the minus side output terminals thereof for decreasing the mmf of the interpole. The outputs of the comparators 31a, 31b are inputted to the adders 33a, 33b through the delay circuits 32a, 32b consisting of the integrating circuits so that the slow response can be achieved for the rapid changes of the first and second voltages detected by the first and second brushes 29a, 29b.

The revolutional speed detected by the rotation detector 15 and the armature current detected by the current detector 20 are multipled by the multiplier 21, and the multiplied value from the multiplier 21 is inputted to the adders 33a, 33b. The adders 33a, 33b adds the output of the multiplier 21 and that of the comparators 31a, 31b. The outputs of the adders 33a, 33b are inputted to the gate signal generators 34a, 34b. The gate signal generators 34a, 34b output the gate signal so that the mmf of the interpole can be increased, when the outputs of the adders 33a, 33 b are plus, and the mmf of the interpole can be decreased, when the outputs of the adders 33a, 33b are minus. The current control switching circuits 26a, 26b control the current flowing through the first and second interpole compensation windings 23a, 23 b by the gate signal from the gate signal generators 34a, 34 b.

The circuit shown in FIG. 3 controls the current flowing through the interpole compensation windings 23a, 23b in response to the variation of the rotational speed and the armature current of the rotor 2, when the first and second voltages of the first and second brushes 29a, 29 b are within the range of ±2 V. When the no-spark zone is immigrated on account of the variation of the surface condition of the commutator and the detected first and second voltages become larger than ±2 V, the current controllers 25a, 25b compensate the current flowing through the interpole compensation windings 23a, 23b by the detected voltages of the first an second brushes 29a, 29b. Therefore, according to the present invention, the sparkless commutation can always take place. Especially, as the current control of the first and second interpole compensation windings 23a, 23b can take place in the starting side or the commutation ending side, respectively, of the interpole cores 6, the D.C. rotary machine of the present invention can only compensate the spark in the commutation starting side or the commutation ending side of the brush 30.

In FIG. 3, the currents flowing through the first and second interpole compensation windings 23a, 23b are controlled by three elements comprising the voltages detected by the first and second brushes 29a, 29b, the revolutional speed, and the armature current. However, the present invention also includes the control by only the voltages detected by the first and second brushes 29a, 29b.

In the above mentioned embodiment, although the setting voltages of the comparators 31a, 31b are explained to be ±2 V, this setting voltages can be selected according to the characteristics of the D.C. rotary machine itself.

Figure 4:
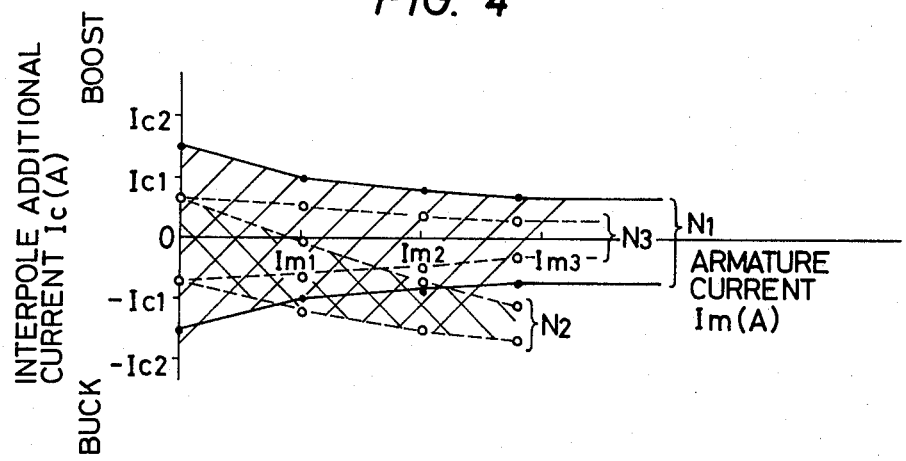
FIG. 4 is a schematic graph showing the relationship between the armature current and the variation of the no-spark zone or interpole additional current.

Referring to FIG. 4, $N_1$, $N_2$ show the characteristics of the ordinary D.C. rotary machine, and $N_3$ show that of the D.C. rotary machine of the present invention. In the ordinary D.C. rotary machine, when the revolutional speeds are $N_1 < N_2$, the no-spark zones immigrate as shown in the shadowed portions of FIG. 3. If we also consider the variation of the armature current $I_m$, when the revolutional speed N is larger and the armature current $I_m$ is smaller, the interpole additional current $I_c$ should be smaller. On the contrary, when N and $I_m$ are larger, $I_c$ should be larger.

According to the present invention, when the revolutional speed changes, the compensation of the total flux by the interpole compensation windings 23a, 23b always takes place irrespective of the variation of the revolutional speed as stated above. Therefore, as shown in FIG. 4, even if N and $I_m$ vary largely, it is not necessary that the auxiliary interpole current $I_c$ should be larger. As a result, according to the present invention, the immigration value of the no-spark zone thereof can be reduced to approximately zero.

We claim:
1. D. C. rotary maching comprising:
   a stator having a yoke of annular shape, a plurality of main pole cores disposed along the inner periphery of said yoke in a relation equally spaced apart by a predetermined distance from each other in the circumferential direction of said yoke, a main pole winding wound around each of said main pole cores, a plurality of interpole cores disposed along the inner periphery of said yoke at positions intermediate between said circumferentially spaced main pole cores, and a interpole winding wound around each of said interpole cores;
   a rotor having a rotary shaft, an armature core fixed to said shaft, and an armature winding wound around said armature core;
   a commutation equipment having a commutator fixedly mounted on said rotary shaft, and brushes held in a position capable of making sliding contact with said commutator;
   first and second interpole compensation winding circumferentially biased toward both sides respectively of said interpole core relative to a circumferential center of said interpole core;
   first and second brush members disposed on a commutation starting side and a commutation ending side of one of said brushes, respectively, for detecting a first voltage between said first brush member and said one brush when the segment of said commutator begins to contact with said first brush member, and a second voltage between said second brush member and said one brush when the segment of said commutator begins to leave from said second brush member; and
   a first current controller connected between said first brush member and said first interpole compensation winding, and a second current controller connected between said second brush member and said second interpole compensation winding, for controlling currents flowing through said first and second interpole compensation windings corresponding to said first and second voltages, respectively.

2. D.C. rotary machine as claimed in Claim 1, wherein said interpole compensation windings are so wound that one of said interpole compensation windings surrounds one of the side faces of an axially extending slot formed in the circumferentially middle portion of the radially inner end of said interpole core and the associated one of the circumferential side faces of said interpole core, and the other of said interpole compensation windings surrounds the other side face of said slot and the associated circumferential side face of said interpole core.

3. D.C. rotary machine as claimed in claim 2, wherein said interpole compensation windings are wound in identical directions so that the directions of magnetic flux produced by said compensation windings differ from each other.

4. D.C. rotary machine as claimed in claim 1, 2, or 3, wherein said first and second current controllers have first and second comparators, respectively, which compare said first and second voltages with setting voltages having a band of plus or minus in the comparators which determine a scope of a no-spark zone, and provide output control signals to the associated compensation winding so that the commutating flux of said compensation winding is increased by the current flowing through said compensation winding when the output signal of the comparator becomes larger than the setting voltage of plus or the commutating flux of said compensation winding is decreased by the current flowing through said compensation winding when the output signal of the comparator becomes smaller than the setting voltage of minus.

5. D.C. rotary machine as claimed in claim 1, 2, or 3, wherein said first and second current controllers have first and second comparators, respectively, which compare said first and second voltages with setting voltages having a band of plus or minus in the comparators which determine a scope of a no-spark zone, and further have delay circuits for averaging the output variation of said controllers.

6. D.C. rotary machine as claimed in claim 1, 2, or 3, further including:
   a rotation detector for detecting revolutional speed of said rotor;
   a current detector for detecting current flowing through said armature winding; and
   said first and second current controllers include adder means for adding a respective one of the detected voltages of said first and second brush members together with signals indicative of the revolutional speed of said rotor and the armature current detected by said current detector to provide an addition value output signal.

7. D.C. rotary machine as claimed in claim 4, wherein said controllers have current controlling switches for controlling the current flowing through said compensation windings by said output singals of said controllers.

8. D.C. rotary machine as claimed in claim 5, wherein said controllers have current controlling switches for controlling the current flowing through said compensation windings by said output signals of said delay curcuits.

* * * * *